United States Patent
Ramsey et al.

[11] Patent Number: 6,029,610
[45] Date of Patent: Feb. 29, 2000

[54] WASHING ANIMALS

[75] Inventors: Francis John Ramsey, Auckland; Warren Lyall Jones, Drury, both of New Zealand

[73] Assignee: Klenzion Limited, New Zealand

[21] Appl. No.: 09/102,227

[22] Filed: Jun. 22, 1998

[30] Foreign Application Priority Data

Jun. 23, 1997 [NZ] New Zealand .......................... 328158

[51] Int. Cl.[7] .......................... A01K 29/00; A01K 13/00
[52] U.S. Cl. ........................................... 119/651; 119/667
[58] Field of Search .................. 119/651, 667, 119/669

[56] References Cited

U.S. PATENT DOCUMENTS

| | | | |
|---|---|---|---|
| 3,699,928 | 10/1972 | Cowan | 119/667 |
| 3,949,709 | 4/1976 | Myers | 119/667 |
| 4,334,504 | 6/1982 | Matthews | 119/667 |
| 4,478,176 | 10/1984 | James | 119/669 |
| 4,697,549 | 10/1987 | Hair | 119/651 |
| 4,836,144 | 6/1989 | Cole | 119/651 |
| 5,063,880 | 11/1991 | Bouthillier | 119/667 |
| 5,630,379 | 5/1997 | Gerk et al. | 119/667 |
| 5,758,603 | 6/1998 | Vivier | 119/669 |

FOREIGN PATENT DOCUMENTS

| | | | |
|---|---|---|---|
| 99634 | 6/1950 | New Zealand | 37/31 |
| 113479 | 5/1956 | New Zealand | 37/31 |
| 117927 | 4/1958 | New Zealand | 37/31 |
| 120149 | 11/1958 | New Zealand | . |
| 121712 | 11/1958 | New Zealand | 37/3 |
| 121938 | 4/1960 | New Zealand | 4/28 |
| 120911 | 8/1960 | New Zealand | 37/31 |
| 170793 | 1/1976 | New Zealand | 37/31 |
| 177471 | 7/1977 | New Zealand | 37/31 |

*Primary Examiner*—Peter M. Poon
*Assistant Examiner*—Elizabeth Shaw
*Attorney, Agent, or Firm*—Fulbright & Jaworski L.L.P.

[57] ABSTRACT

A method of washing animals prior to slaughter involves passing the animals 40 one after another through a race 10 having means 35 to apply a pressurized spray of a cleaning fluid to the animal at least in those areas where incisions will be made. The animal exits from the race into a holding pen before passing to a wash station to wash off the cleaning fluid. The fluid is a high pH dilute detergent solution and is supplied under pressure to a solenoid operated valve 65 and from there to spray bars 20, 21, 22, 30, 50 and 70 so that the spray continues so long as valve 65 is open. The presence of the animal 40 is detected by a flexible wand 60 switch which turns on or off the solenoid operated valve.

12 Claims, 3 Drawing Sheets

WASHING ANIMALS

FIELD

This invention relates to washing animals, and has particular, though not sole, application to the washing of animals prior to slaughter. It has particular relevance to the washing of sheep or cattle at abattoirs.

BACKGROUND

Sheep and cattle have been traditionally washed at abattoirs, prior to slaughter, by either hosing them down with a high pressure water hose, or by allowing the animals, particularly so in the case of sheep, to pass through a swim bath, in which the animals are almost totally immersed in water, and have to swim to the far side (usually with their head above water). Neither is satisfactory. A swim bath has the advantage that the movement of the animals though the bath tends to loosen some of the dirt, and may partially clean the animals. A swim wash used on its own may also provide a breeding ground for bacteria. The animal may superficially appear to be clean, but in fact may pick up bacteria from the bath, which may in turn contaminate the meat.

It is desirable to clean the pelt in such a way that it is not damaged, and it is also particularly desirable that dirt is removed from the pelt in at least those areas where incisions will be made by the slaughtermen, in order to minimise the risk of contamination of the meat either by cutting through a dirty pelt, or when the carcass is being opened up, a dirty portion of the pelt falling back on to the meat, giving rise to the possibility of contamination if dirt or bacteria from the pelt comes into contact with the open carcass.

OBJECT

It is an object of this invention to provide an improved method and/or apparatus for washing animals, or one which will at least provide the public with a useful choice.

STATEMENT OF INVENTION

In one aspect the invention provides apparatus for washing animals prior to slaughter, the apparatus comprising a race having an entrance into which animals can be led, a passageway, and an exit, the passageway being wide enough to allow the passage of one animal at a time, the race having a plurality of spray nozzles directed inwards to spray an animal passing through the race, means for supplying a cleaning fluid under pressure to the spray nozzles and means for regulating the amount of cleaning fluid applied to each animal, the exit of the race leading to one or more holding pens, the holding pens being connectable to a wash station so that in use the animals are coated with the cleaning fluid and held in the holding pens prior to washing off the cleaning fluid at the washing station.

Preferably the means for regulating the amount of solution, comprises a first valve controlled by a first movable member which protrudes into the passageway so that it can be contacted by an animal moving through the passageway to cause the valve to be opened, and to cause the valve to be closed when not in contact with an animal.

Preferably the first movable member consists of a resilient wand switch and the first valve is a solenoid operated valve so that when the wand is in contact with an animal the solenoid moves the valve into the open position and when the wand is not in contact with an animal the solenoid moves the valve into the closed position.

Preferably the first movable member comprises a hinged gate which is biased towards a first position in which it protrudes into the passageway, and the first valve is a butterfly valve which is mechanically coupled to the gate so that as the gate is moved towards a second open position, the valve is caused to move into an open position, and as the gate returns to the first position the valve is caused to return to the closed position.

Preferably a second movable member controls the operation of a second valve to regulate the supply of cleaning fluid to the spray nozzles, and preferably there is means to lock the first valve in the fully open position so that the supply of fluid is controlled by operation of the second valve, and the second movable member consists of a resilient wand switch and the second valve is a solenoid operated valve so that when the wand is in contact with an animal the solenoid moves the valve into the open position and when the wand is not in contact with an animal the solenoid moves the valve into the closed position.

In another aspect the invention provides a method of washing animals prior to slaughter, wherein the animals are led one after the other into a race wide enough to accommodate one animal at a time, automatically detecting the presence of an animal at a point in the race and spraying the animal with a cleaning fluid to at least those areas where incisions will be made, and the cleaning fluid is left on the animal for a sufficient time prior to washing at a subsequent washing station that effective removal of dirt is achieved by washing or rinsing off the cleaning fluid before the animal is slaughtered.

Preferably a measured amount of cleaning fluid is applied to each animal.

Preferably the cleaning fluid is a detergent/water solution applied in the form of a spray.

Preferably the detergent has a pH greater than 9.

Preferably the detergent has a pH of about 11.

Preferably the detergent/water solution includes at least a non-ionic surfactant.

Preferably the detergent/water solution includes an anionic surfactant and a bacteriocide.

These and other aspects, which we considered in all its novel aspects, will become apparent from the following description, which is given by way of example only with reference to the accompanying drawings.

DRAWINGS

Preferably the application station is positioned close to the unloading area of an abattoir, so the animals can be unloaded from stock trucks and allowed to pass directly through the application station prior to reaching a holding pen. As will be apparent from the description with reference to FIGS. 2 and 3, the application station can take the form of a spray race, which can be portable, so it can be positioned where required in an abattoir. However, we believe that the most effective position would be to place the spray race in close proximity to the unloading area so that stock can pass directly through the spray race.

By applying a measured amount of a cleaning fluid such as a detergent/water solution to an animal, the animal can be then held in a holding pen for a required dwell time to allow the detergent/water solution to work into the animals pelt and to loosen any dirt, dags or other contamination on the pelt (in this specification the term pelt is used generically to refer to the exterior skin/hair/wool of an animal and includes for example a sheepskin, the hide of cattle, the skin of goats, and in fact the exterior of any animal to be slaughtered).

In some cases the animals will pass from the application station (ie a spray race) direct to a wash station. In some cases the transit time between the application station and the wash station will be sufficient for the detergent to work effectively. As will be apparent from the following description, we have found that a minimum dwell time of 10 minutes is effective, although longer dwell times can be used and are recommended. In some cases the holding pen may be the same as the wash station, so that the animals can be held in a pen having appropriate wash nozzles, which would not be turned on until the appropriate dwell time had passed. For example in some applications the holding pen or pens will each comprise a wash station, preferably in the form of a belly wash station where the animals can be confined in a space, with nozzles mounted on the floor, or underneath a perforate floor, for example a grill, so that water can be sprayed upwardly towards the underside of the animals to remove any dirt, and in the case of a perforate floor, allow the dirt to pass through the floor and be removed from the wash station. Although in some cases the wash station may consist of a swim wash.

FIRST EMBODIMENT

Figure 1:
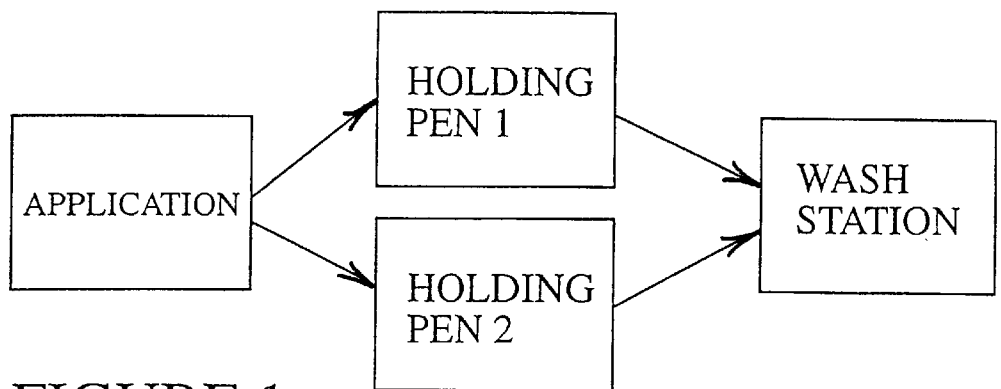
FIG. 1 Is a block diagram showing movement of animals from the application station through holding pens to a wash station.
Figure 2:
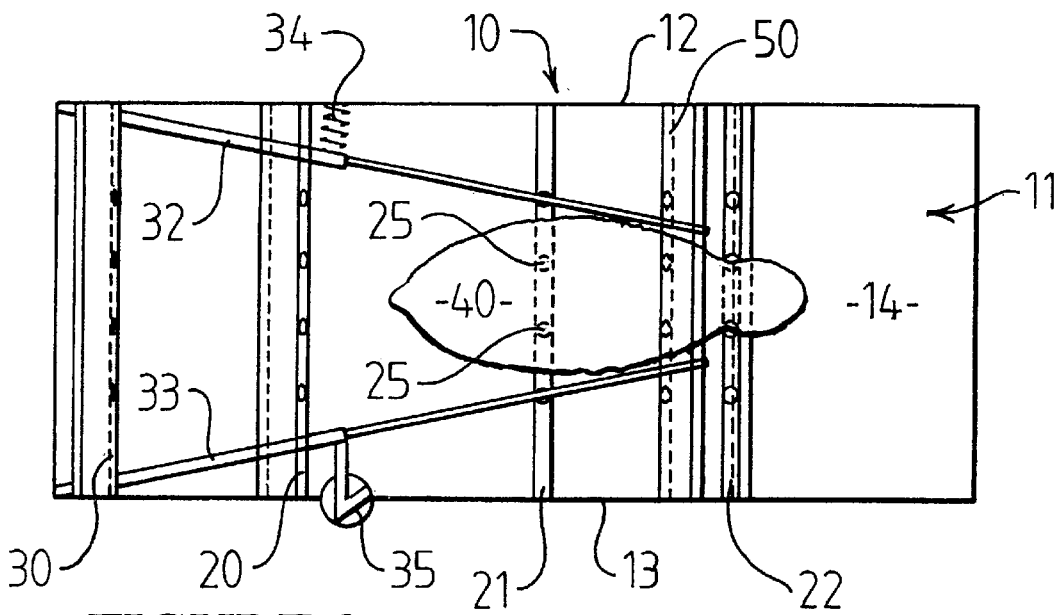
FIG. 2 Illustrates a first wash race in top plan view.
Figure 3:
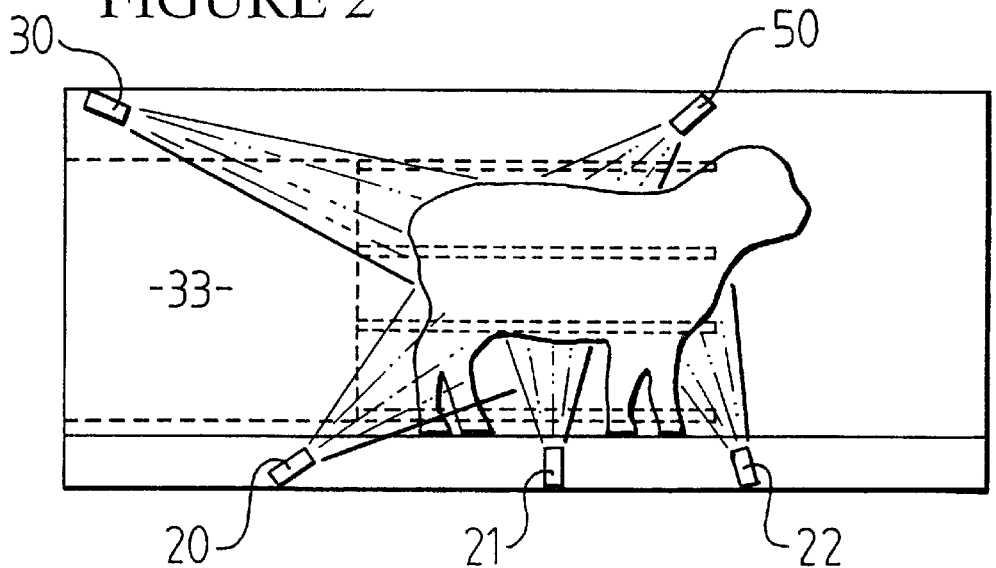
FIG. 3 Illustrates a first wash race in side view showing a position of a sheep in relation to the spray nozzle.

Turning now to FIGS. 2 and 3 a first application station comprises a race 10, having a passageway 11 with vertical sides 12, 13, and a floor 14. Mounted on the floor 14 are a plurality of spray bars, and in FIG. 3, these can be seen as spray bars 20, 21 and 22. Each spray bar has a plurality of nozzles 25, and as shown in FIG. 2, each spray bar has four such spray nozzles 25 directed towards the animal.

The lower rear most spray bar 20 is angled upwardly towards the rear of the animal as shown in FIG. 3, and this spray bar is angled so that each spray nozzle sprays a jet at approximately 45° above the horizontal towards the lower rear of the animal. The middle spray bar 21 is preferably aligned so that the spray nozzles point vertically upwards to spray the underside of the animal. The forward lower spray bar 22 is angled slightly backwards, making an angle of approximately 75° to the horizontal, in order to spray under the animals neck as it passes through the spray station.

In addition to the three lower spray bars, one or more upper spray bars are provided. As shown in FIG. 2 and FIG. 3 there is an upper spray bar 30, having a plurality of nozzles extending across it, and as shown in FIG. 2, there are four such spray nozzles, with the spray bar 30 angled so that the nozzles point forwards, and downwards towards the back rear of the animal, as shown in FIG. 3. In addition an extra spray bar 50 can be mounted at the front of the race and connected to the pump by a tap or other valve so that it can be turned on or off, as required. This extra spray bar 50 is helpful if the sheep are shed stored.

We have found that spray nozzles of about 3 mm diameter are useful when supplied with presurised cleaning fluid at about 130 psi (gauge) measured just before the spray nozzles.

Each spray bar is connected to a pump and a reservoir containing a detergent/water solution. The pump is driven by a suitable power source, which may be any convenient prime mover, typically a three phase electric motor, or an internal combustion engine such as a diesel engine, or stationery petrol engine capable of providing sufficient power to the pump. The size and rating of the pump may vary depending upon the size of animals to be sprayed. In the case of sheep, we have found that a centrifugal pump rated at about 130 psi is sufficient to supply a metered quantity of approximately 2 liters of spray per animal. We have found that one pump is sufficient for a spray race, but in the case of larger animals it may be desirable to utilise more than one pump, to increase the number of spray nozzles, to change the spray pattern, or to change the spray volume or spray pressure. Other types of pump or other means of supplying the fluid under pressure could be used. It will be appreciated that such changes can be readily effected by a person skilled in the art.

Metering means is provided between the pump and the spray bars so that a measured amount of liquid can be supplied to the spray bars for each animal. As shown in FIG. 2, there are a pair of gates 32, 33 which are biased towards a closed position, and need to be pushed open by the animal as it passes into the race. Gate 32 has a spring 34, to bias it towards the closed position. Gate 33 is connected to a butterfly valve 35 and has a lighter loading than the spring 34 so that movement of the animal into the race will cause gate 33 connected to butterfly valve 35 to open more readily than gate 32 connected to the spring 34. The pressure of liquid supplied by the pump to the butterfly valve 35 may supply a small amount of torque to return gate 33 to the closed position, or there may be some other bias means for example a light spring, or the effect of gravity, if the gate 33 is set slightly off vertical, so that there is a tendency for the gate to move towards the closed position, and associated closing of valve 35.

In operation an animal 40 passing into the spray race 10 as shown in FIG. 2 will cause the gate 33 to be moved towards an open position allowing the butterfly valve 35 to open thereby allowing the liquid supplied by the pump to be pumped to the spray bars 20, 21, 22 and 30 so that the spray continues so long as butterfly valve 35 is open. If the animal moves at a measured rate through the spray race the spray will continue, so long as gate 33 is in an open position, but as the rear of the animal passes the end of gate 33, and gate 33 is now free to return to the closed position, valve 35 will close, and the supply of spray will cease. By appropriately spacing animals as they enter the spray race, and allowing the animals to move freely through the spray race, the design of this apparatus allows an approximate minimum of 2 liters of spray per animal, which is a suitable amount for sheep. This mechanical coupling between the gate and the valve is suitable for 1000 animals per hour. The mechanical coupling is of robust design and whilst it is suitable for sheep, it is particularly suited to larger and stronger animals such as cattle, although cattle will require a larger volume of spray and a larger more robust spray race.

SECOND EMBODIMENT

The second embodiment involves the use of a modified spray race to provide increased throughput of sheep. Turning now to FIGS. 4–8 the application station 10 has been modified to include a wand switch 60 and a solenoid operated valve 65, controlling the flow of cleaning fluid to the spray nozzles. In addition to the spray bars 20, 21, 22, 30, and 50 with jet nozzles, a pair of vertical bars 70 with fan nozzles are provided near the exit of the race to provide a curtain of cleaning fluid through which the animal must pass before leaving the race. A roof 80 is also provided to help contain the spray within the confines of the race.

The gates 32, 33 can be locked in the fully open position so that valve 35 is fully open. The solenoid operated valve 65 is in series with valve 35 so that operation of the solenoid controls the "on"—"off" flow of the pressurised cleaning fluid from the pump to the spray bars. We prefer to keep both the mechanically operated valve 35 and the solenoid operated valve 65 on the same race to provide a "back-up" if there is a fault with the wand switch or operation of the solenoid controlled valve 65.

Figure 5:
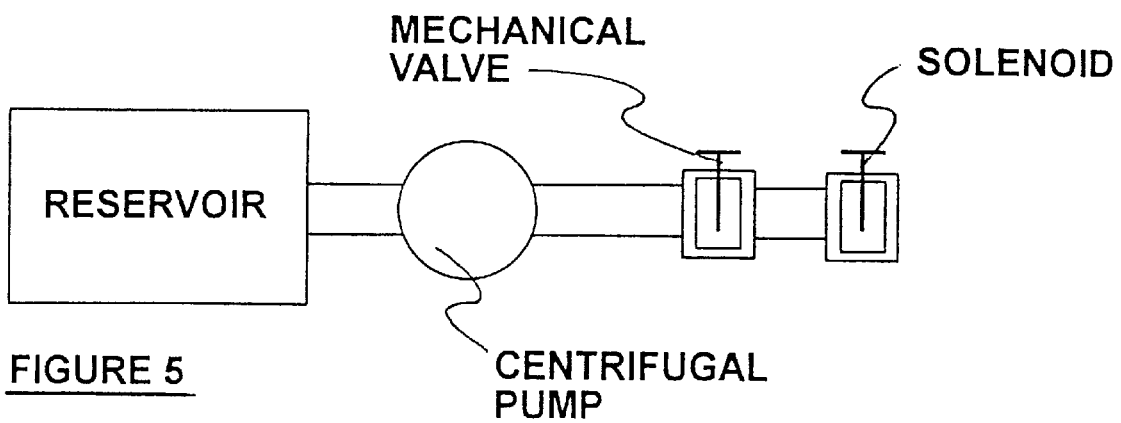
FIG. 5 Is a schematic diagram showing the relationship of the two valves.

FIG. 5 shows the supply of the cleaning fluid from a reservoir via a centrifugal pump to a 1.5" diameter supply line connected to a 1.5" diameter valve 35 and thence to the 1.5" diameter solenoid operated valve 65 before being supplied to the spray bars. In this case we prefer to use a centrifugal pump driven by a 10 horse power three phase electric motor. The size and rating of the pump may vary depending upon the size of animals to be sprayed. In the case of sheep and the solenoid operated valve, we have found that a centrifugal pump operated at 130 psi is sufficient to supply a metered quantity of approximately 2 liters of spray per animal, allowing 2000 sheep per hour to be treated with the cleaning fluid. This pressure together with the solenoid operated valve 65 allows a fast "on-off" time and sufficient penetration of the spray into the animal's pelt without damaging the animal. Higher pressures may damage the animal or cause too much bounce back of the spray.

Although not shown in FIG. 5, we prefer to use a dilute 1:50 solution of detergent in water and to dose the detergent at a metered rate into the reservoir as it is filled with water.

Figure 8:
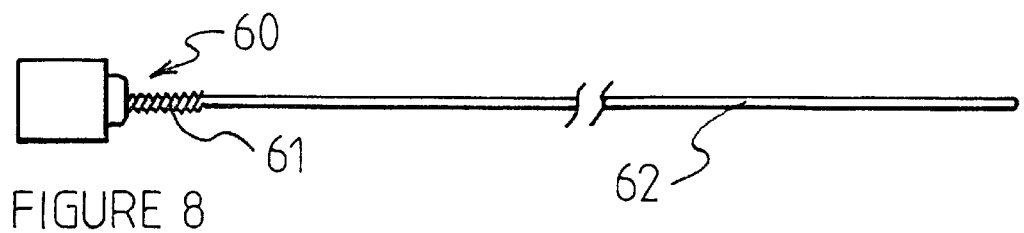
FIG. 8 Illustrates a wand switch.

A suitable wand switch 60 is shown in FIG. 8. It is available from Telemecanique of France as part number XCK-P-H19. It is rated 240 volts at 3A, and has a flexible wand 62 which can protrude into the path of the animal.

Figure 6:
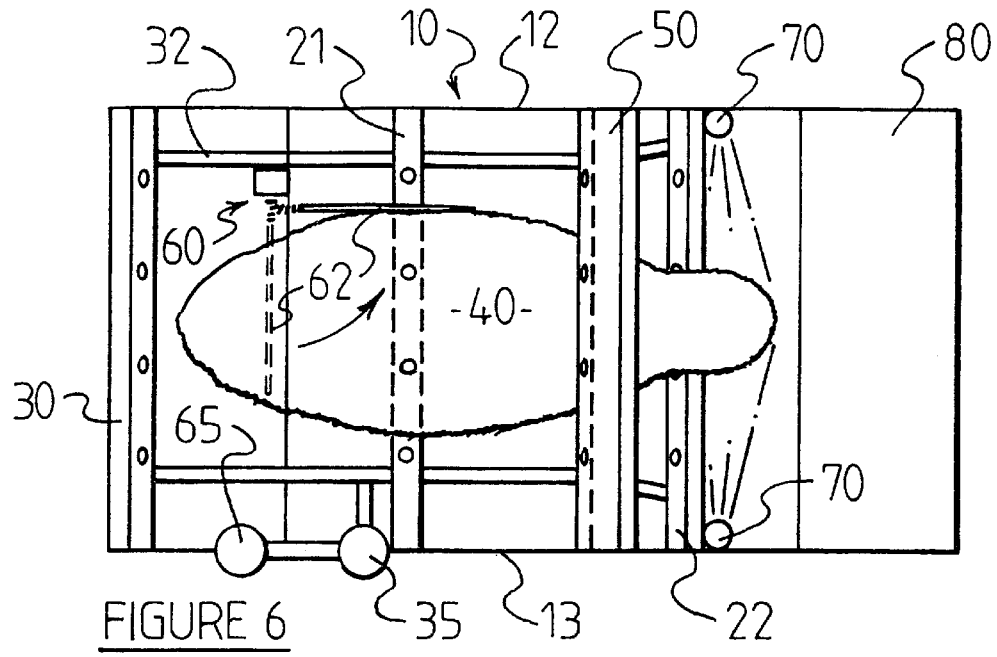
FIG. 6 Illustrates a second wash race in top plan view.
Figure 7:
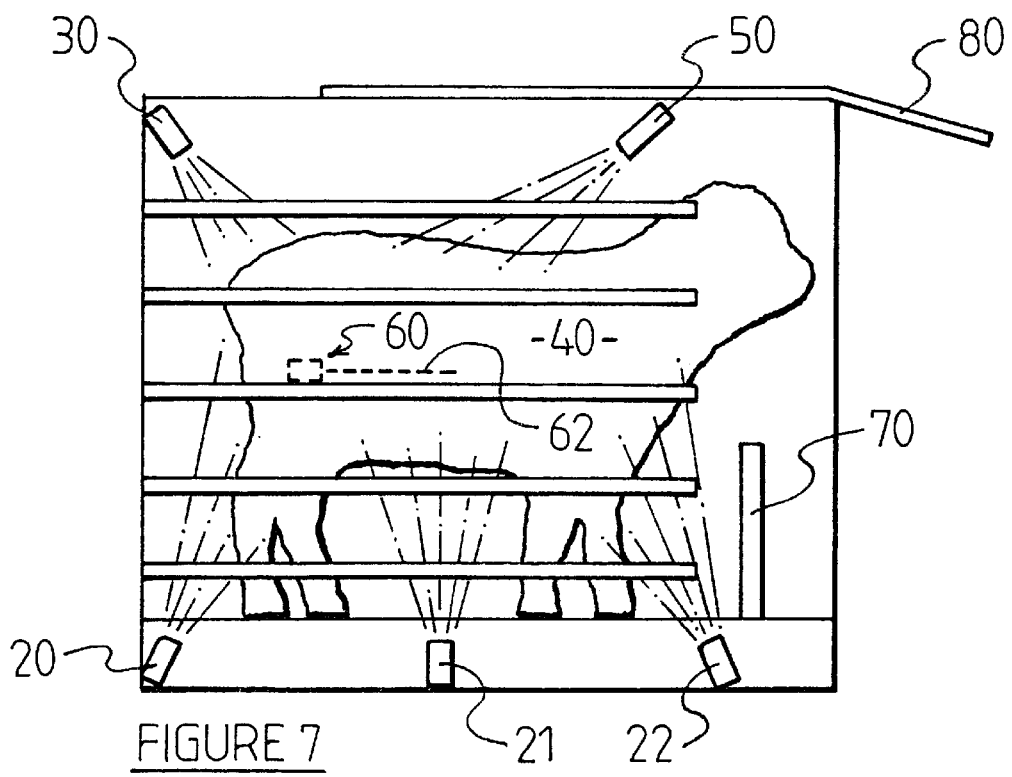
FIG. 7 Illustrates the second wash race in side view showing a position of a sheep in relation to the spray nozzles.

In operation an animal 40 passing into the spray race 10 as shown in FIG. 6 will contact the wand 62 of the wand switch 60, and cause the solenoid operated valve to turn on. Thereby allowing the pressurised cleaning fluid supplied by the pump to be pumped to the spray bars 20, 21, 22 and 30 so that the spray continues so long as valve 35 is open.

If the animal moves at a measured rate through the spray race the spray will continue, so long as it is in contact with the wand 62 which because it is flexible and has a spring 61 the wand can bend and conform to the animal's body as shown in FIG. 6.

As the rear of the animal passes the wand, the wand will return to its resting position in which it protrudes into the passageway. In this position the solenoid will cause the valve 65 to return to the closed position.

Figure 4:
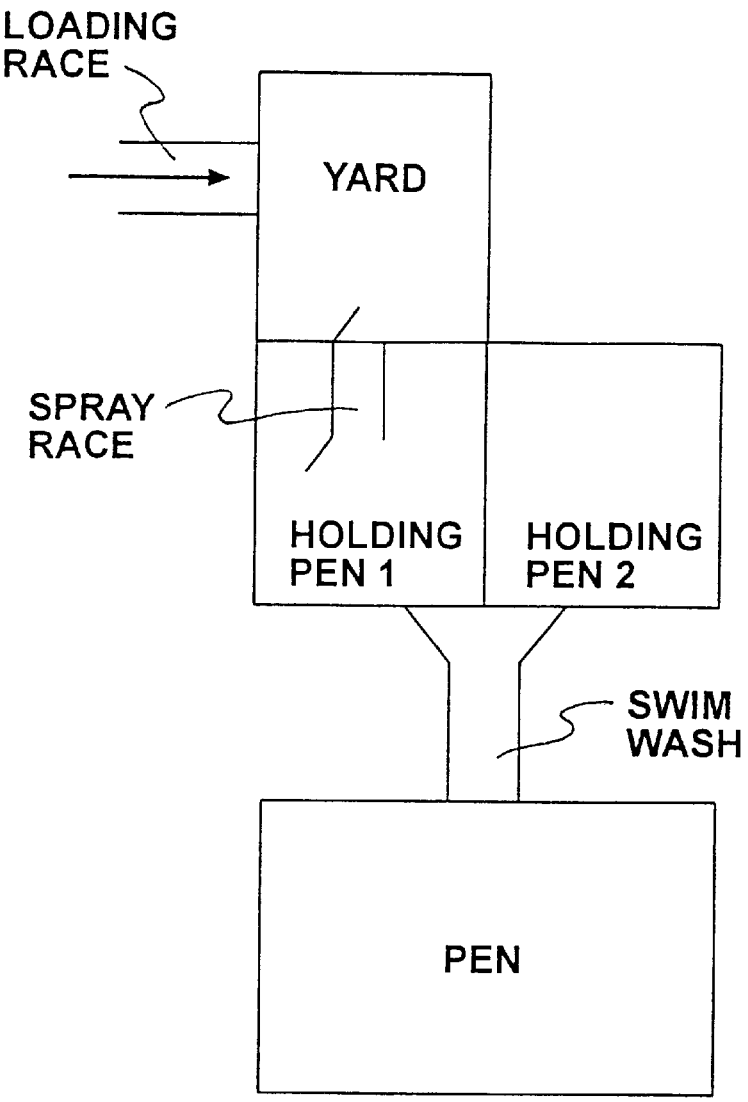
FIG. 4 Is a schematic diagram showing the relationship of the spray race to the holding pens.

FIG. 4 shows the placement of the spray race 10 between a first yard and one or more holding pens. In the most preferred arrangement the animals are held in the main yards and not washed until just prior to slaughter, as this minimise the risk of dust or dirt being picked up in the final pens. By using the cleaning fluid applied in the spray race, and holding the animals in a holding pen for at least 10 minutes prior to washing, we have found that the animals are well cleaned. FIG. 4 shows the use of a swim wash as such swim baths are suitable for use with the high throughput race of FIG. 6.

CLEANING FLUIDS

Any suitable detergent can be used, a suitable detergent is one which will assist in releasing dirt from the animal, will "wet" the animal and remain on the wool or hide of the animal for the required holding period, will not taint the meat if it comes into contact with an incision, and will not harm or stain the pelt. Such a detergent should be approved for use by appropriate regulatory authorities, for example the Ministry of Agriculture and Fisheries in New Zealand.

We prefer to use KLENZION (trade mark), which is a mixture of non-ionic and anionic surfactants having a pH of 11 (such a high pH prevents the spread of the foot and mouth virus). The surfactants are chosen to ensure that the cleaning fluid wets the pelt and remains on the pelt for the required time prior to washing so that it can soften the dirt and dags so they can easily be washed off. It is available from Klenzion Limited, P O Box 1207, Taupo, New Zealand, Phone 07-378-9454 and Fax 07-378-9459. It is a detergent especially formulated for use with this invention and can be used at a dilution rate of about 1:50 with water. It can also include a bacteriocide. A suitable bacteriocide for use with this invention is a quaternary ammonium compound, such as ACTICIDE (trade mark) available from Thor Chemicals Ltd.

INDUSTRIAL APPLICATION

The method and apparatus of this invention allow large numbers of animals to be cleaned prior to slaughter, minimizing the risk of contamination of the meat and leaving a clean pelt as a useful byproduct.

VARIATIONS

Larger versions of the spray race can be constructed for cattle or the like.

Instead of using a valve such as the solenoid operated valve or a valve 35 connected to a gate, other less preferred means for regulating the flow of liquid to the spray bars can be used. For example a timer may be used to control the time of application. Or a metering pump may be used to control a metered amount of liquid to the spray bars. Or in another version, light beams may be used to detect the position of the animal so that the animal moving past a first light beam will allow a valve to open to supply liquid to the spray bars, and when the animal moves past a second position the valve may be allowed to close.

Although other types of pumps or valves could be used we believe that the combination of a centrifugal pump and a solenoid operated valve 65 or a butterfly valve 35 is advantageous if 1000 to 2000 animals per hour are to be treated, as this combination allows for rapid switching on or off of the spray so that each animal is coated with the required amount of cleaning fluid.

Finally, it will be appreciated that various other alterations or modifications may be made to the foregoing without departing from the scope of this invention as set forth in the claims.

We claim:

1. Apparatus for washing animals prior to slaughter, wherein the animals are led one after the other into a race wide enough to accommodate one animal at a time, the presence of an animal is automatically detected at a point in the race and the animal is sprayed with a cleaning fluid to at least those areas where incisions will be made, and the cleaning fluid is left on the animal for a sufficient time prior to washing at a subsequent washing station so that effective removal of dirt is achieved by washing or rinsing off the cleaning fluid before the animal is slaughtered, the apparatus comprising a race having an entrance into which animals can be led, a passageway, and an exit, the passageway being wide enough to allow the passage of one animal at a time, the race having a plurality of spray nozzles directed inwards to spray an animal passing through the race, means for supplying a cleaning fluid under pressure to the spray nozzles and means for regulating the amount of cleaning fluid applied to each animal, the exit of the race leading to one or more holding pens, the holding pens being connectable to a wash station so that in use the animals are coated with the cleaning fluid and held in the holding pens for a predetermined time period prior to washing off the cleaning fluid at the washing station.

2. Apparatus for washing animals prior to slaughter, as claimed in claim 1, wherein the means for regulating the amount of solution, comprises a first valve controlled by a first movable member which protrudes into the passageway so that it can be contacted by an animal moving through the passageway to cause the valve to be opened, and to cause the valve to be closed when not in contact with an animal.

3. Apparatus for washing animals prior to slaughter, as claimed in claim 2, wherein the first movable member consists of a resilient wand switch and the first valve is a solenoid operated valve so that when the wand is in contact with an animal the solenoid moves the valve into the open position and when the wand is not in contact with an animal the solenoid moves the valve into the closed position.

4. Apparatus for washing animals prior to slaughter, as claimed in claim 2, wherein the first movable member comprises a hinged gate which is biased towards a first position in which it protrudes into the passageway, and the first valve is a butterfly valve which is mechanically coupled to the gate so that as the gate is moved towards a second open position, the valve is caused to move into an open position, and as the gate returns to the first position the valve is caused to return to the closed position.

5. Apparatus for washing animals prior to slaughter, as claimed in claim 4, wherein a second movable member controls the operation of a second valve to regulate the supply of cleaning fluid to the spray nozzles, and wherein there is means to lock the first valve in the fully open position so that the supply of fluid is controlled by operation of the second valve, and the second movable member consists of a resilient wand switch and the second valve is a solenoid operated valve so that when the wand is in contact with an animal the solenoid moves the valve into the open position and when the wand is not in contact with an animal the solenoid moves the valve into the closed position.

6. A method of washing animals prior to slaughter, wherein the animals are led one after the other into a race wide enough to accommodate one animal at a time, automatically detecting the presence of an animal at a point in the race and spraying the animal with a cleaning fluid to at least those areas where incisions will be made, and the cleaning fluid is left on the animal for a sufficient time prior to washing at a subsequent washing station that effective removal of dirt is achieved by washing or rinsing off the cleaning fluid before the animal is slaughtered.

7. A method of washing animals prior to slaughter, as claimed in claim 6, wherein a measured amount of cleaning fluid is applied to each animal.

8. A method of washing animals prior to slaughter, as claimed in claim 7, wherein the cleaning fluid is a detergent/water solution applied in the form of a spray.

9. A method of washing animals prior to slaughter, as claimed in claim 8, wherein the detergent has a pH greater than 9.

10. A method of washing animals prior to slaughter, as claimed in claim 9, wherein the detergent has a pH of about 11.

11. A method of washing animals prior to slaughter, as claimed in claim 10, wherein the detergent/water solution includes at least a non-ionic surfactant.

12. A method of washing animals prior to slaughter, as claimed in claim 11, wherein the detergent/water solution includes an anionic surfactant and a bacteriocide.

* * * * *